United States Patent [19]

Kraska

[11] 4,005,000
[45] Jan. 25, 1977

[54] ELECTROCOATING APPARATUS AND METHOD

[75] Inventor: John L. Kraska, Riverside, Ill.

[73] Assignee: National Can Corporation, Chicago, Ill.

[22] Filed: Sept. 18, 1975

[21] Appl. No.: 614,353

Related U.S. Application Data

[63] Continuation-in-part of Ser. No. 397,889, Sept. 17, 1973, abandoned.

[52] U.S. Cl. .......................... 204/181; 204/297 W; 204/299 EC; 204/300 EC
[51] Int. Cl.² ................. B65G 49/02; C25D 13/06; C25D 17/06
[58] Field of Search ...... 204/181, 300 EC, 299 EC, 204/297 R

[56] References Cited

UNITED STATES PATENTS 3,024,184  3/1962  Bowes et al. .................... 204/300
3,847,786  11/1974  Landauer et al. ................ 204/181

*Primary Examiner*—Howard S. Williams
*Attorney, Agent, or Firm*—James E. Anderson; Ralph R. Rath

[57] ABSTRACT

Apparatus and method for supporting and conveying objects or articles, such as can ends, through an electrolytic solution is disclosed herein. The apparatus consists of an endless conveyor that has a plurality of hangers with the hangers being opened to receive objects and closed to grip the article. Each of the hangers has a fixed body with a jaw on the fixed body biased to a closed position. The hanger also has electrically conductive means for accommodating current flow from a fixed cathode track through the jaw to an object being gripped between the jaw and the body so that the articles are automatically coated when the energized articles are passed through a basin containing the solution and a fixed anode.

25 Claims, 27 Drawing Figures

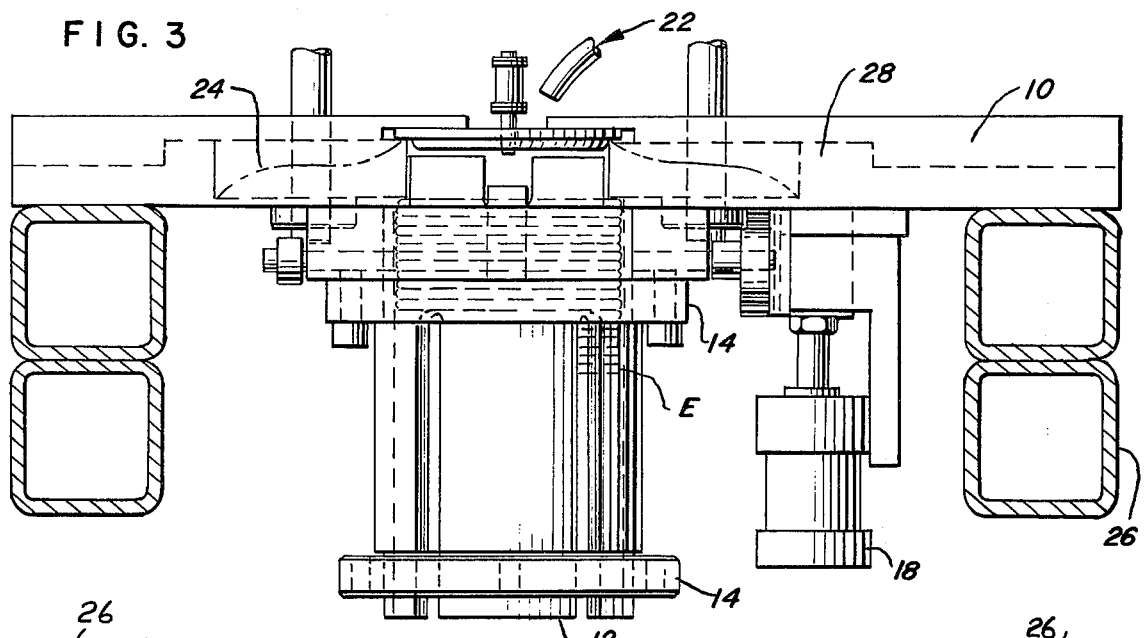
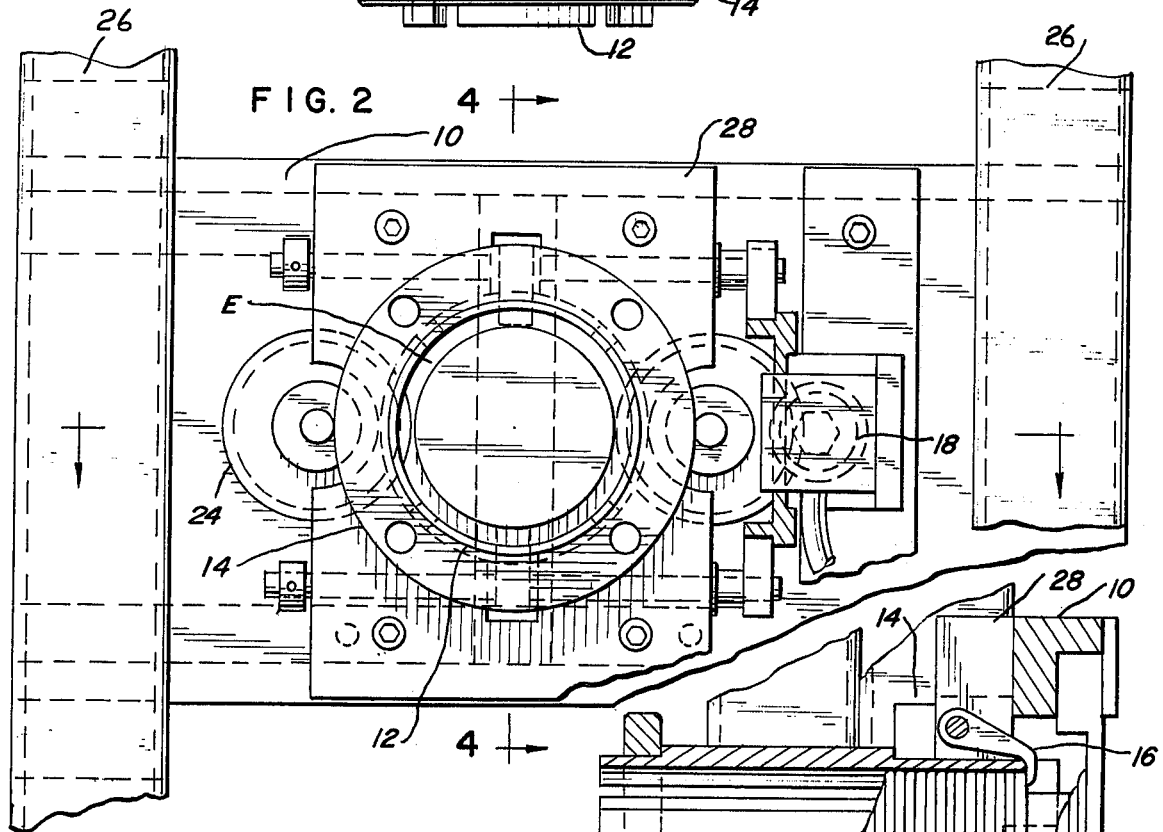
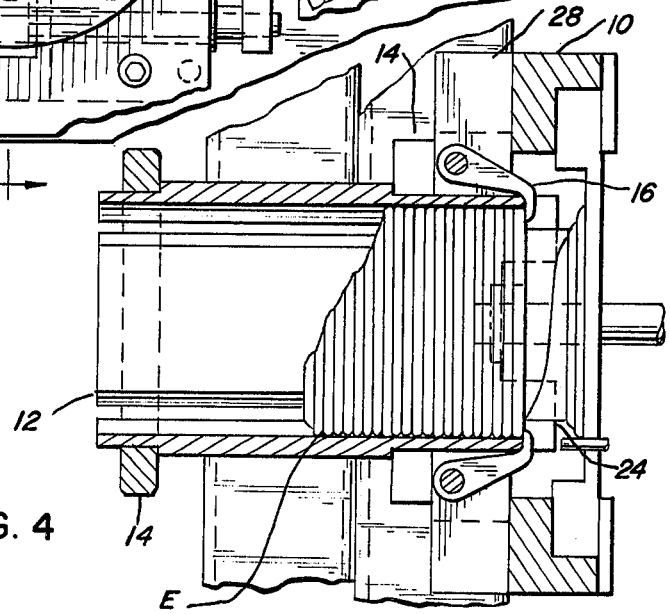

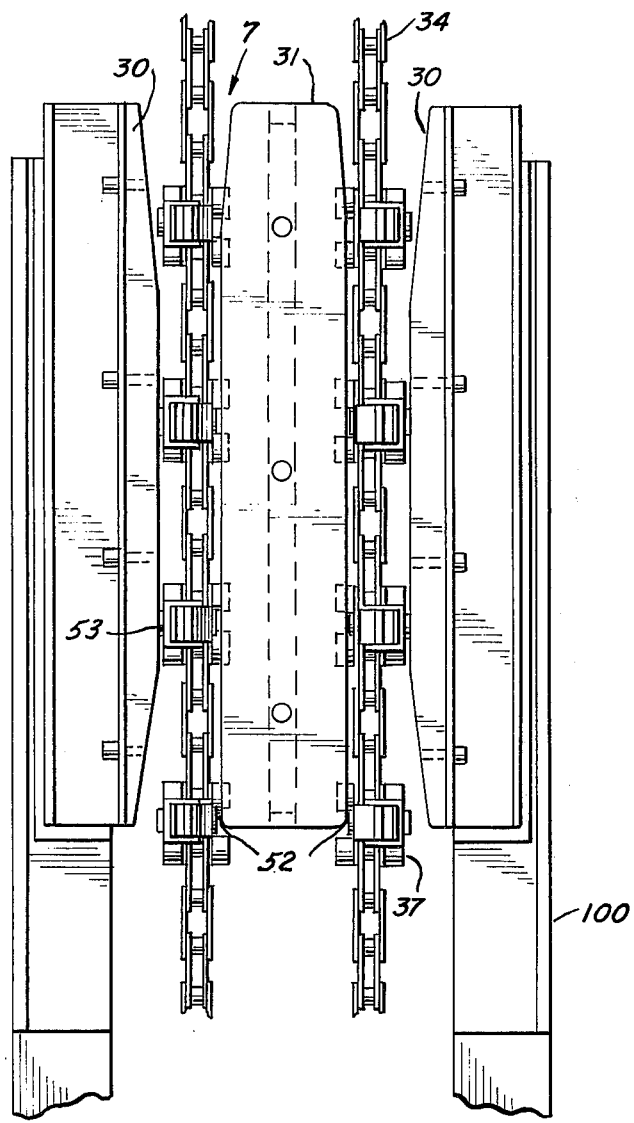

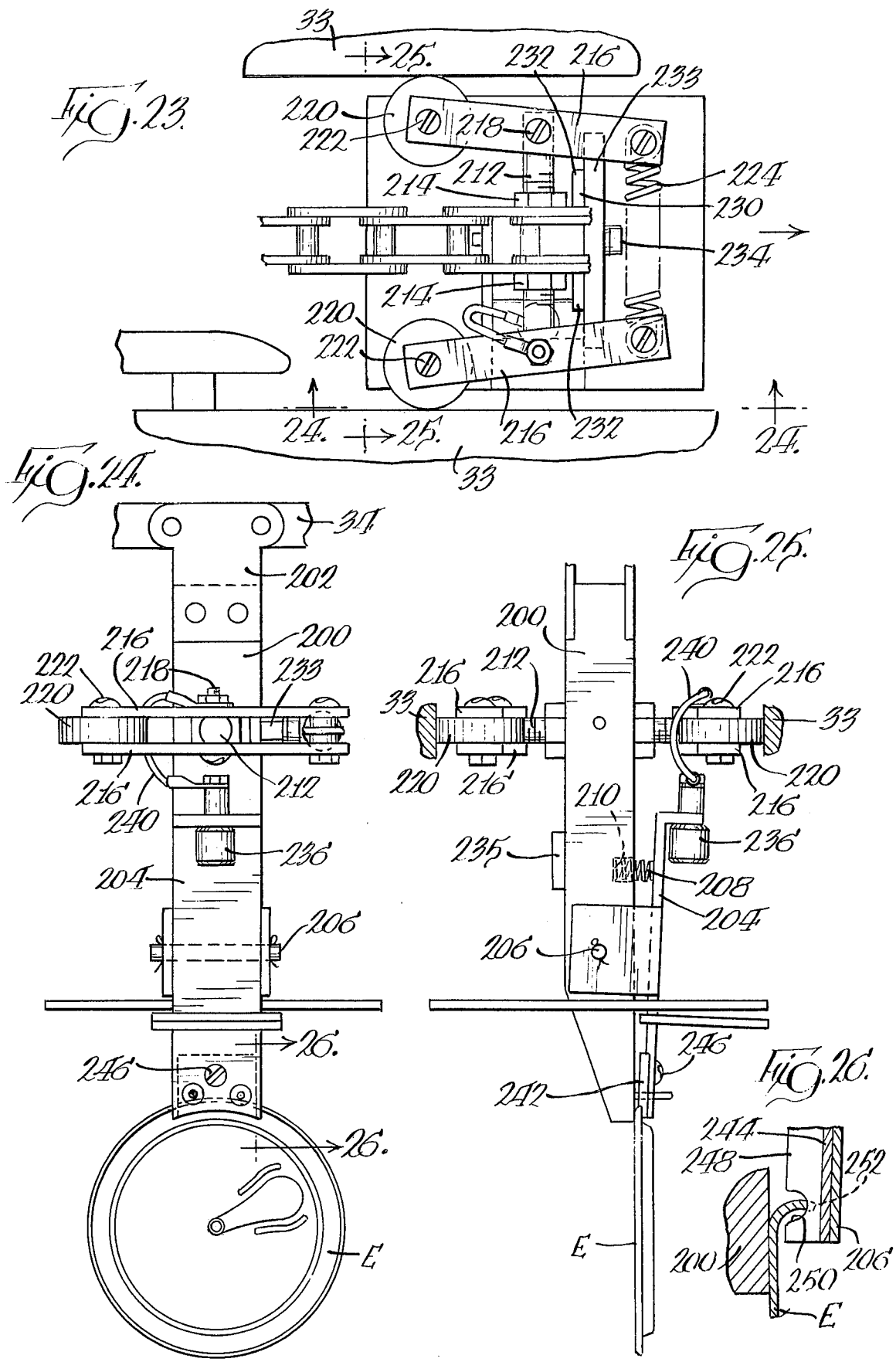

ELECTROCOATING APPARATUS AND METHOD

REFERENCE TO RELATED APPLICATION

This application is a continuation-in-part of application Ser. No. 397,889, filed Sept. 17, 1973, now abandoned.

BACKGROUND OF THE INVENTION

This invention relates to apparatus for electrocoating. The apparatus, according to this invention, is particularly adapted to the electrocoating of nestable objects such as can ends. More specifically, the invention is particularly adapted for "post repair" of ends.

In the formation of container ends for packaging beer or other carbonated beverages, it is necessary to have the internal surfaces, which are exposed to the product, protected from environmental product attack. In the formation of such container ends, a blank flat sheet material is normally coated by applying a base coat with a roller or other device onto both surfaces of the metal stock prior to the fabrication of the container end. Flat blanks are then cut from the stock and converted into container ends which include a peripheral flange that is utilized for double seaming the end to a container body. In addition, for beer and carbonated beverage products, the container end also has a tear strip formed therein with a tab attached to the tear strip.

During the conversion of the flat blank into the finished end, it is virtually impossible to prevent the removal of some of the coating from certain areas, such as the areas where the frangible connection is produced between the tear strip and the remainder of the end panel. This may result in bare metal spots or uncoated surfaces, on the end, particularly the internal surface that is ultimately exposed to the product. Thus, manufacturers normally apply a subsequent coating to at least the exposed bare metal areas or surfaces of the container end, which is commonly termed "post repair" of the ends.

For years it has been customary to spray a top coat on the interior surface of the fabricated end to seal any scratches, breaks or discontinuities that are produced in the coating during the conversion from the flat blank to the finished end. While this has been found to be an acceptable practice, there are certain shortcomings in utilizing spray coating. One of these shortcomings is the fact that the entire surface must be recoated to insure that all bare spots are covered, which results in wasting coating material in areas where no additional coating is necessary. Another shortcoming is that the spray coating usually incorporates solvents which are dangerous to inhale and must be removed by heating the end.

While the electrodeposition of resinous materials on metal surfaces has been known and proposed for can bodies (see for example, U.S. Pat. Nos. 3,647,675; 3,694,336 and 3,801,485), to the best of applicant's knowledge a successful commercial process for coating can ends for use with beer and carbonated beverages has heretofore not been developed.

There are several problems inherent in any attempt to electrocoat such ends and particularly the "post repair" of coated ends. For example, in order to completely coat the ends, the electrolytic coating solution must be in contact with all surface areas to be coated. Therefore, a means must be devised to move the ends through the coating area which will allow for such full contact. Furthermore, substantial build-up of electrocoated resin on the metallic surfaces making electrical contact with the end should be avoided; otherwise, electrocoating must be interrupted periodically while such surfaces are cleaned. Another problem is encountered when can ends having an easy open end feature are to be electrocoated. These ends generally feature pull tabs that are held in place by a rivet integrally formed in the end, the exposed end of which is located in a recessed area in the bottom surface of the end. Achieving a uniform coating of a rivet-containing end with resin, therefore, has proven to be especially difficult.

A further problem in "post repair" coating of ends is the difficulty in producing metal-to-metal contact between the coated end and an energy source which is necessary for proper electrocoating.

SUMMARY OF THE INVENTION

Accordingly, these difficulties are minimized or eliminated by utilizing a hanger which, first, engages the can end only in areas thereof which are not to be electrocoated; secondly, does not interfere with the flow of electrolytic solution around the ends; thirdly, minimizes resin build-up on the hanger by breaking the electrical connection to the metallic end contact where no end is being held by the hanger; and fourthly, produces excellent electrical contact between the end and the supporting hanger. Furthermore, this hanger, when used in combination with other features of this invention, produces a uniformly coated easy open can end and permits the electrocoating operation itself to be substantially continuous.

Further details, features and advantages of this invention will become apparent from the following description thereof when read in conjunction with the accompanying drawings, in which:

FIG. 2 is a partial front view facing into the portion of the apparatus into which the can ends are fed in stacked relation and individually introduced to the hanger;

FIG. 3 is a plan view of the apparatus shown in FIG. 2;

FIG. 4 is an axial cross-sectional view taken along line 4—4 of FIG. 2;

FIG. 7 is a front view of the cams effecting opening of the hanger for can end insertion;

FIG. 23 is a top plan view of a further modified form of hanger structure for supporting the can end;

FIG. 24 is a side elevation view of the hanger shown in FIG. 23;

FIG. 25 is an end view of the hanger shown in FIG. 23; and

FIG. 26 is an enlarged fragmentary sectional view as viewed along line 26—26 of FIG. 24.

DETAILED DESCRIPTION

Figure 1:
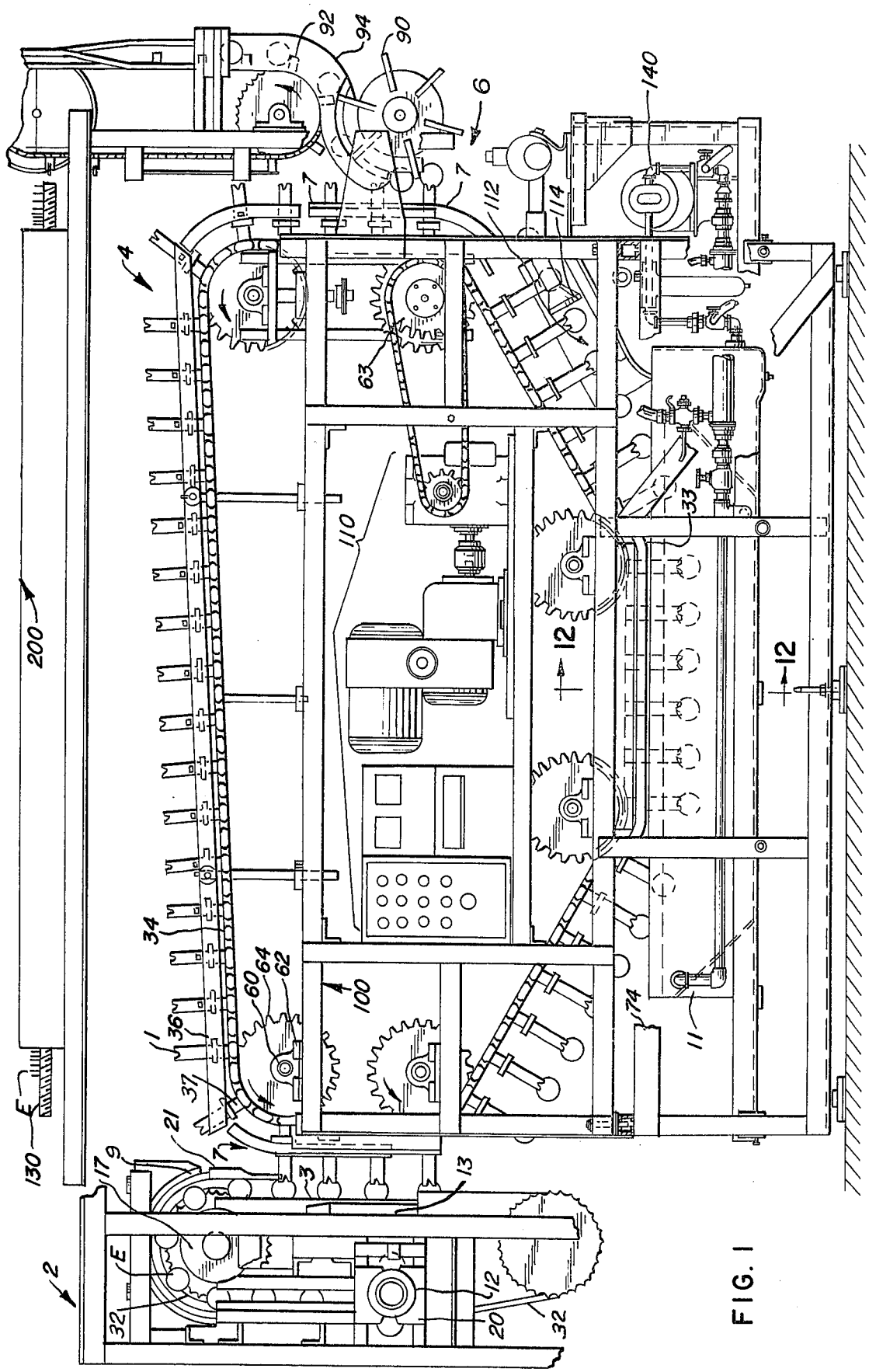
FIG. 1 is a front elevation of the apparatus for electrocoating can ends constructed in accordance with this invention.

Prior to a detailed description of the invention, a brief reference to FIG. 1 will provide a broad summary of the arrangement and operation of the parts employed.

Stacked can ends E are conveyed and inserted in the hangers 1 by means of end feeding and marrying mechanism 2 which is comprised of end feeding mechanism 20, studded chain 32 and cams 7. The hangers 1, attached to chain 34, are then conveyed into the electrocoating basin 11 where the electrocoating operation is performed. The coated ends are conveyed through a rinse tank 112 containing deionized water then past a hot air blower 114 and removed from the hanger 1 by cams 7. After removal the ends are loaded on an endless screw 130 for conveying through curing oven 200.

Having generally described the overall arrangement and operation of the apparatus, the specific parts which make up the apparatus will be described in detail.

The first part of the apparatus is the end feeding and marrying mechanism 2 illustrated in FIG. 1.

Can ends are initially placed in the feeding mechanism 20 by stacking them in the end feed tube 12 as illustrated in FIGS. 2, 3, and 4. The end feed tube 12 is held in place by attachment rings 14 which are bolted to back plate 28, the back plate being bolted to support members 10. The support members are attached to the frame 26 as shown in FIG. 2. Individual ends E are passed into contact with worm gear 24 by fingers 16 which are actuated by air cylinder 18. Vacuum means 22 are provided to urge the individual ends against the studded chain 32 shown in FIG. 1. As shown in FIG. 1, the ends are maintained in position by means of track guide 9 as they are raised by the studded chain 32 which is propelled by sprocket 17. The ends are propelled around the arc prescribed by sprocket 17 and are allowed to drop parallel to hangers 1 as the studded chain 32 completes its path around the sprocket 17.

Figure 9:
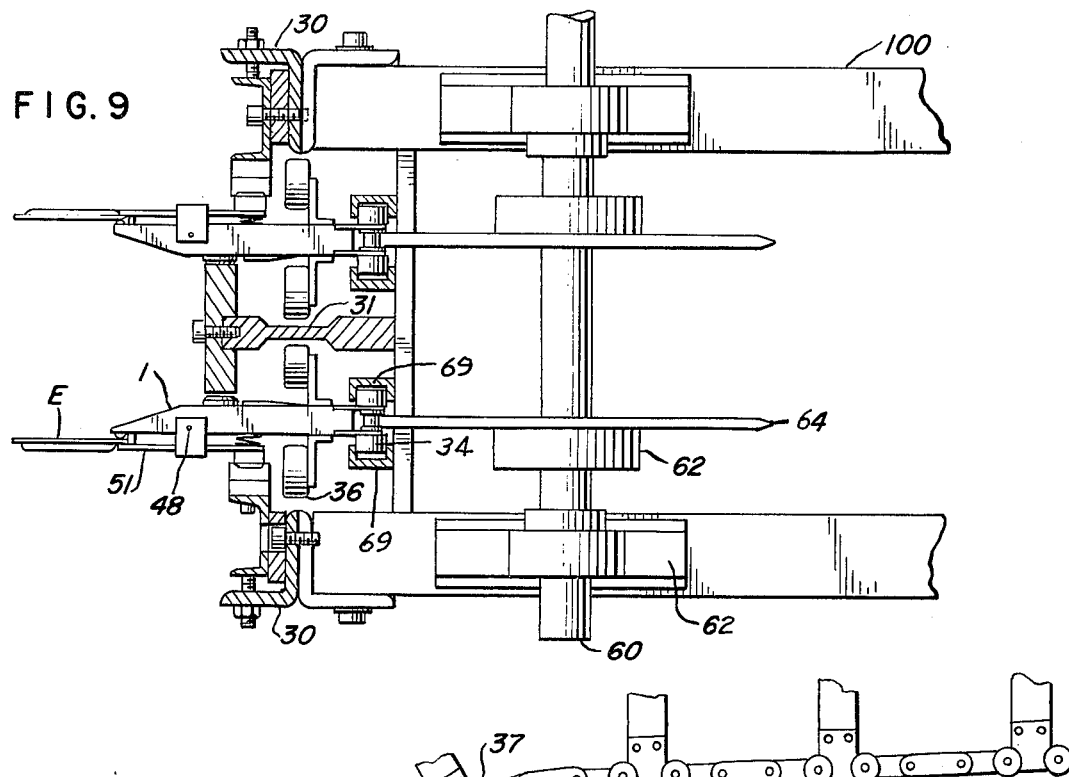
FIG. 9 is a plan view of the structure shown in FIG. 8.
Figure 8:
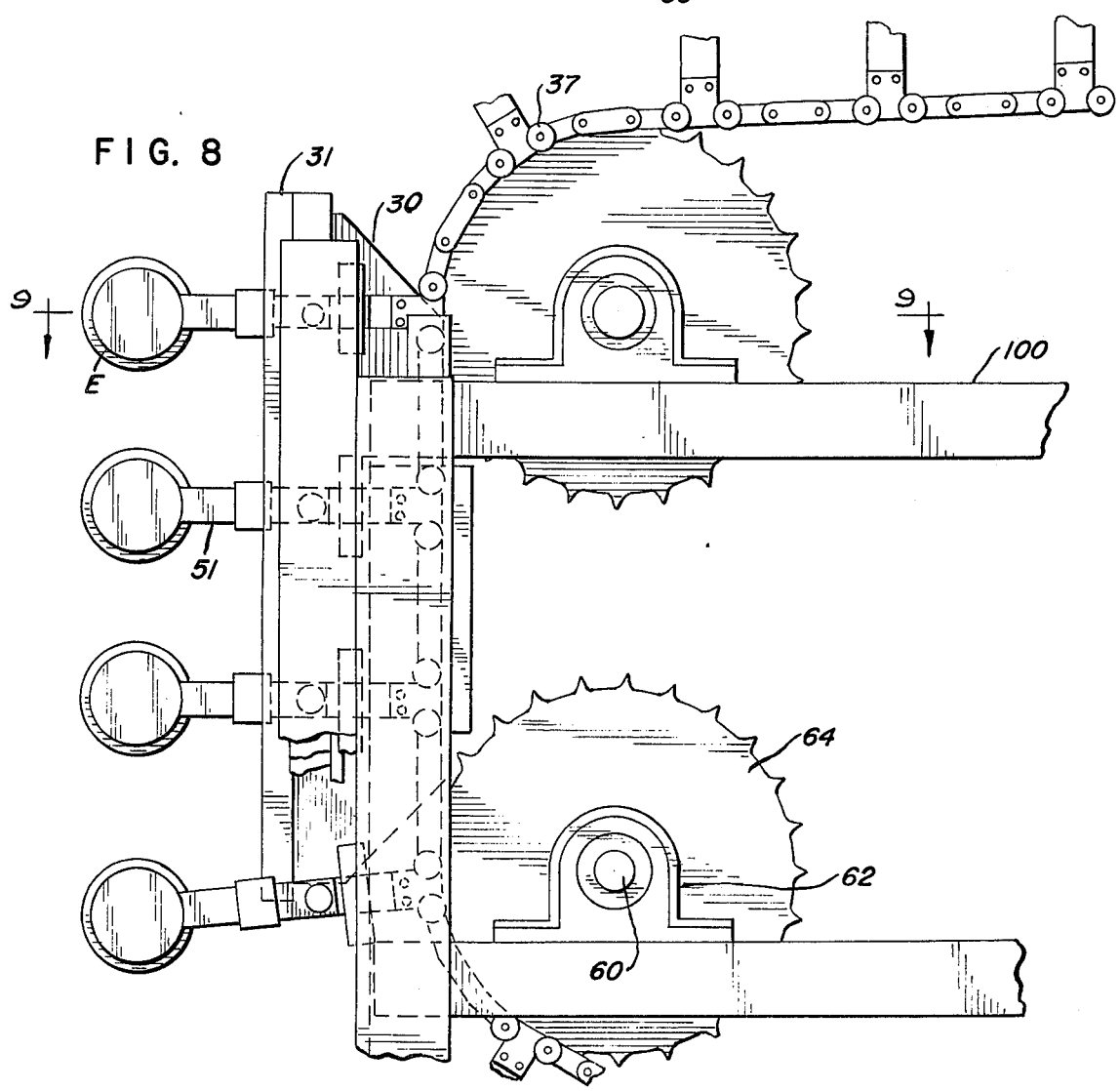
FIG. 8 is a front view showing the path of the hanger conveyor just after insertion of the ends.

The hanger and conveying apparatus 4, as represented in FIG. 1, includes the hanger 1 and its conveying means. The hanger 1 is attached to chain 34 by mounting piece 37. A series of sprockets 64 mounted on shafts 60 are supported by pillow blocks 62 which rest upon frame 100, as shown in detail in FIGS. 8 and 9, are used to direct and support the chains. As shown in FIG. 1, drive sprocket 63 is powered by motor means 110 which is used to move the chain and hanger combination through the path indicated. Chain guards 69, as illustrated in FIG. 9, are used to minimize transverse movement of the chain and are mounted upon the frame, spacedly, along the path of the chain 34.

Before continuing with the detailed description of the remainder of the apparatus, a detailed description of the hangers is provided.

Figure 5:
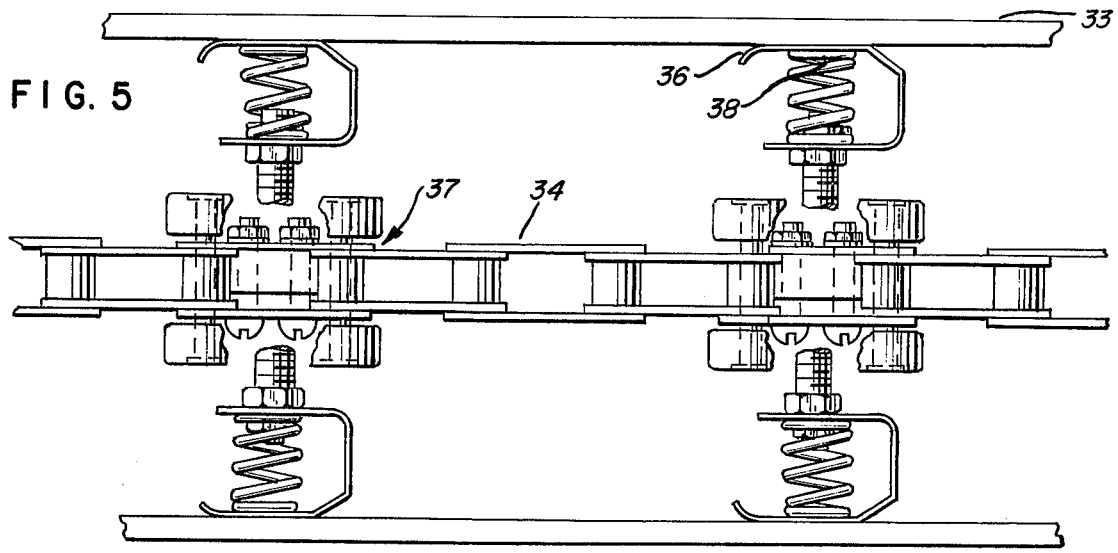
FIG. 5 is a detailed top view of an endless chain for conveying hangers with the hangers attached.
Figures 6A, 6B:
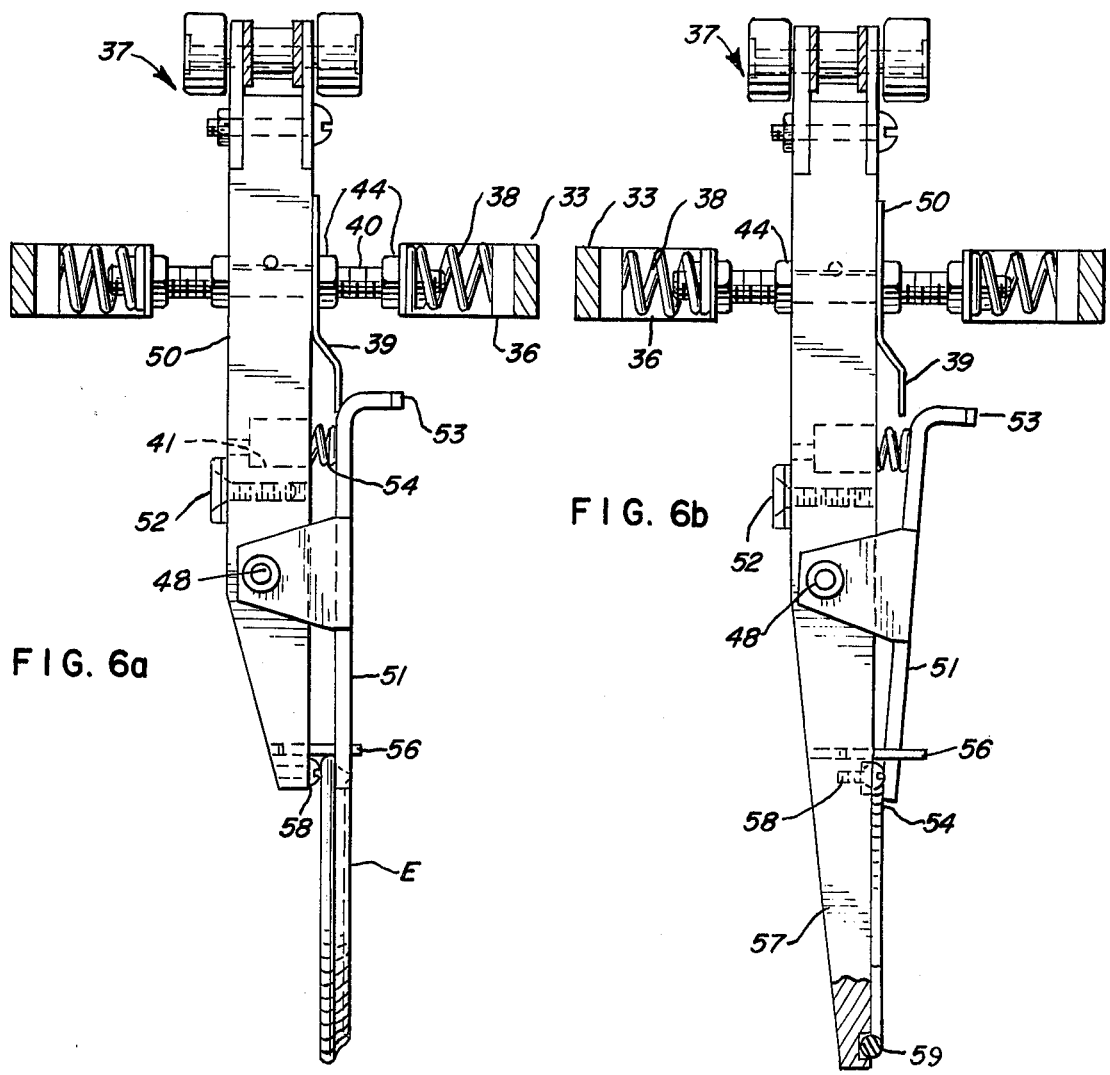
FIGS. 6a and 6b are front views of different embodiments of the hanger of this invention.

FIG. 6a provides a view of one embodiment of the hanger. The hanger brushes or contact elements 36 are designed to be in electrically conductive contact with the cathode track 33 shown in FIG. 5. The springs 38 inside brushes 36 are in electrically conductive contact with the leaf contact spring 39 which is attached by screw 40 to the electrically conductive body 50. Nuts 44 engage headless screw 40 to mount the brushes 36 on the hanger body 50. When an end is present between body 50 and jaw 51, as illustrated in FIG. 6a, the release spring or bearing means 54 is depressed in spring cavity 41, and the electrically conductive jaw 51, having flange 53, is in contact with the contact spring 39 and, therefore, in electrically conductive contact with the brushes 36. Of course, it will be appreciated that the lower edge of the internal surface of jaw 53 is in direct contact with an uncoated edge of the end. This uncoated edge is developed when the flat blank is severed from the coated sheet stock. This arrangement produces excellent metal-to-metal contact between jaw 51 and end E.

When in the coating basin 11 the brushes are in electrically conductive contact with the cathode tracks 33 and current flows through the brushes 36, contact spring 39, jaw 51, and the uncoated cut edge to the end E.

The can end, when in place rests against positioning members 56 at its outer extremity and is maintained in position by position screw 58. The positioning members and position screw insure that only the lip of the can end will be gripped by the jaw. Wear plate 52 is provided for contact with the support cam. When an end is not held between the electrically conductive jaw 51 and the body extension 50 forming the support jaw, the release spring 54 pushes the jaw 51 around the pivot point 48 to a first position with respect to body 50 away from contact or in spaced relation with respect to contact leaf spring 39 as illustrated in FIG. 6b.

FIG. 6b shows an alternative configuration of the hanger. This figure illustrates an extension of the body 50 to form an extended jaw 57 of the same shape as the can end itself. The extended jaw has, affixed to its circumference, an O-ring sealing element 59 designed to abut the can end at its periphery and seal it from electrocoating. Depending upon the electrocoating conditions and the particular choice of resins, it may be desirable to prevent electrocoating of the top of the can end. If the top is coated, a film might form which, if an easy open end is used, could bind the tab to the surface of the top making the tab more difficult to remove. The configuration of the hanger shown in FIG. 6b is preferred in such circumstances.

FIGS. 23 through 26 show a further modified configuration for hanger 1. This particular hanger structure is more specifically adapted for post repair of ends which are formed from a stock material that is coated on both sides. The hanger structure shown in FIGS. 23 through 26 consists of a hanger body 200 which is connected to the endless chain 34 through a suitable bracket 202. Hanger body 200 has a jaw 204 pivotally supported by pin 206 and biased to a closed position by a spring 208 supported in a recess 210 on the body.

Hanger body 200 also has means intermediate opposite end for engaging cathode track 33. This means is most clearly shown in FIG. 23 and consists of a threaded screw 212 extending through the body and held in a fixed position with respect to body 200 by a pair of locked nuts 214. The respective outer ends of the threaded screw have links 216 pivotally supported thereon intermediate opposite ends by a bolt 218. A pair of rollers 220 are respectively rotatably supported on one end of the links 216 through further screws 222. The opposite ends of the links 216 are interconnected by a spring 224 so that the rollers and links are biased to a first position that will now be described.

The first position for links 216 and rollers 218 is defined by a plate 230 that has opposite ends 232 located in vertical alignment with links 216. Thus, when the rollers are free of engagement with cathode tracks 33, spring 224 will bias the links into engagement with the ends 232 of plate or stop 230. However, if rollers 220 are in engagement with cathode tracks 33, as shown in FIG. 23, the spring 224 aids in maintaining positive contact between rollers 220 and cathode tracks 33 to insure sufficient contact to produce a current flow from cathode tracks to rollers 220. Preferably, a bar 233, having a length greater than plate 230 is positioned next to the plate and extends between the respective pairs of links to guide the links during pivotal movement between positions. Plate 230 and bar 233 may be secured to body 200 by set screw 234.

Thus, when the hanger is between a pair of cathode tracks 33, a current flow will be developed through rollers 220, links 216, screw 212 and main body 200. To insure that there is sufficient current flow to fully energize all portions of the container end E, it is peferable that one screw 218 be directly connected to pivoted jaw 204 through a lead wire 240. The advantages of a direct connection between jaw 204 and links 216 will become more apparent hereafter.

The hanger shown in FIGS. 23–26 also has a cam engaging member 235 on body 200 and a cam engaging member 236 on jaw 204 to move the jaw to an open position. Preferably, cam engaging member 236 is in the form of a cam roller.

Applicant has determined that it is highly advantageous to provide direct metal-to-metal contact between the container ends and at least a portion of the hanger to insure proper electric current flow from cathode track 33 to end E. For this purpose, pivoted jaw 204 has an insert 242 at the lower end thereof which engages one surface of end E. The details of this insert are illustrated in FIG. 26. As shown, insert 242 is substantially U-shaped and has a web portion 244 connected to the lower edge of jaw 204 by a screw 246. A pair of legs 248 on opposite edges of web 244 are directed towards body portion 200. The respective legs have recesses or notches 250 formed therein and the recesses or notches are positioned so as to be in alignment with the peripheral edge 252 of container end E. As in the previous embodiments, positioning pins 260 are utilized to position the ends with respect to body 200.

Insert 242 is formed from a steel which is preferably hardened so that the Brinell hardness of the steel is substantially greater than the Brinell hardness of the metal utilized in forming the end E. Preferably, the insert 242 has a Brinell hardness number which is at least twice the Brinell hardness number of the metal alloy utilized in forming end E. Furthermore, it is desirable that the inner surface of groove 250 be rather sharp to insure that the edge of groove 250 will cut into the edge of container end E, particularly the edge of the peripheral flange thereon.

The use of the insert and the direct metal-to-metal contact between the edge of the insert and the peripheral edge of the end E has been found to greatly enhance the coating characteristics in the normal post repair of the end. Of course, it will be appreciated that the peripheral edge of the container end is devoid of any coating since the original roll coating that was applied to the flat metal stock is applied prior to the severing of the circular blank to form the end. Thus, the cut edge is devoid of any coating.

It has also been found that the above arrangement has an additional advantage in that any coating build-up on the insert 242 will be removed during the penetration of the sharp edge of groove 250 into the metal edge of the container end E which will improve the metal-to-metal contact resulting in greater current conducting capacity from the jaw 204 to the end E.

The above-described hangers are opened as shown in FIG. 7 by means of a set of cams 7 mounted on frame 100. Each cam set 7 consists of cam 31 that provides a cam surface for engaging hanger wear plate 52 or member 235, and a second cam 30 that provides a surface for engaging flange 53 of the electrically conductive jaw 51 or roller 236 of electrically conductive jaw 204. Cam surfaces on cams 30 and 31 are positioned so that conductive jaw 51 or 204 is pivoted to an open position for receiving an end E when the hangers are between the cams. The ends are inserted by means of the can insertion apparatus 2 which, as described above, orients the can ends parallel to and between the open jaws of the hangers as they pass through the cams. As illustrated in FIG. 1, a spring biased pusher plate 13 pushes the can ends firmly into the jaws just prior to the closing of the jaws as they leave the area of the cams 7.

FIGS. 8 and 9 further illustrate the wedding of the ends to the hangers, the path of the hanger and the relationship between the hanger, the cam just after insertion. After the ends are inserted they are carried by the hangers to basin 11.

Figure 10:
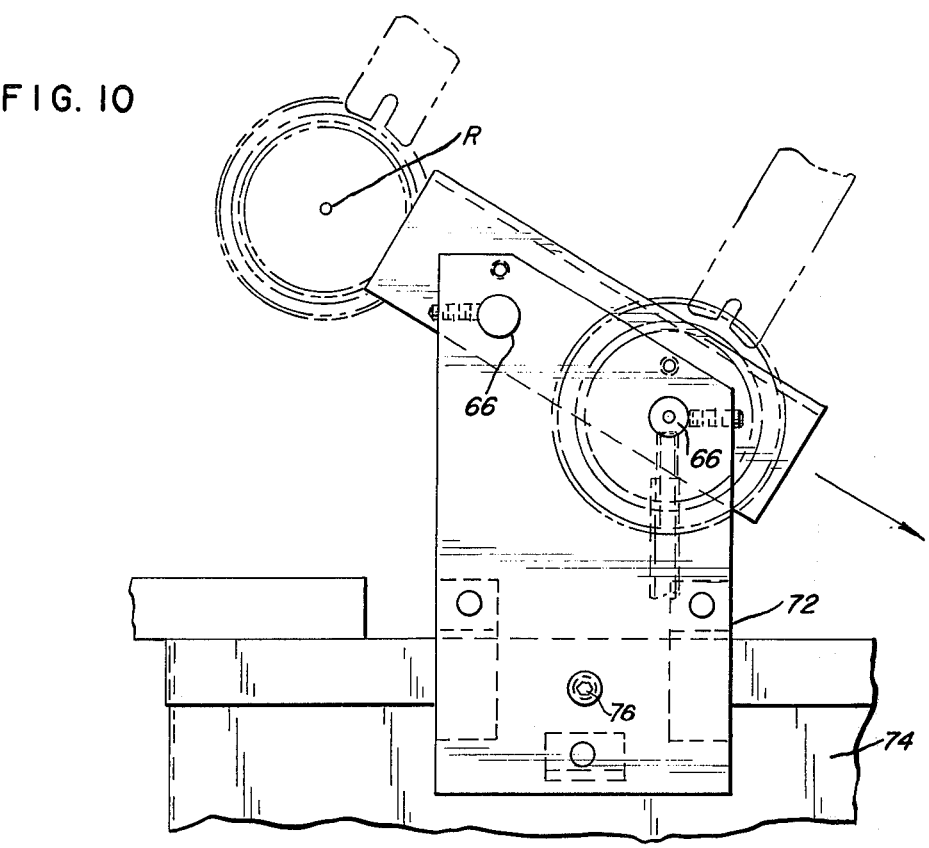
FIG. 10 is a frontal view of the spraying station from which a stream of electrolytic solution is directed toward the area of the rivet head.
Figure 11:
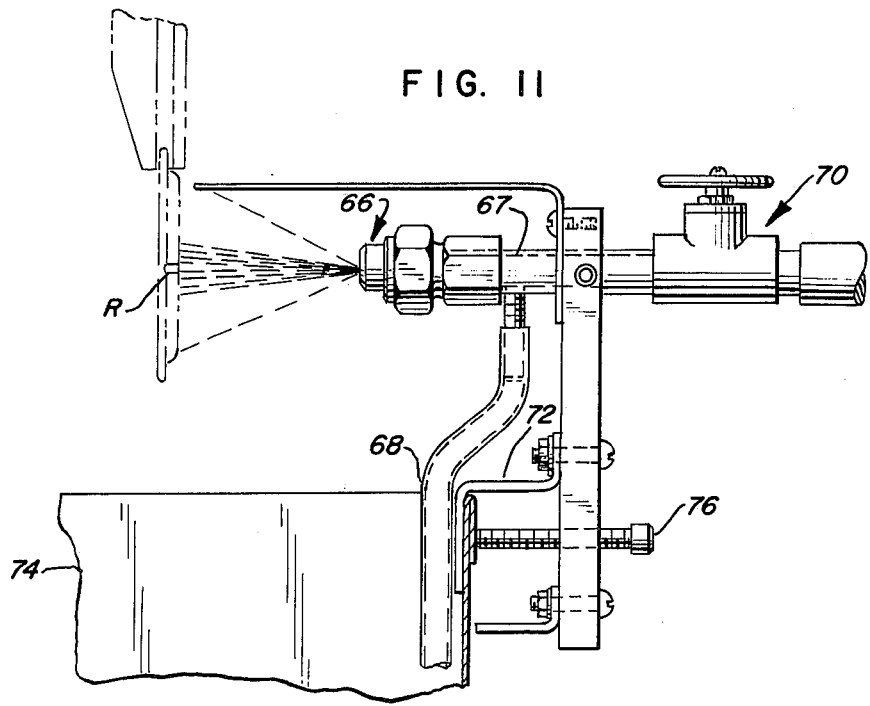
FIG. 11 is a view transverse to the direction of travel of the conveyor showing the spraying station of FIG. 10.

If the can ends to be electrocoated are of the easy open end type, they are, prior to entering basin 11 preferably directed past a spraying station illustrated in FIGS. 10 and 11. A concentrated stream of electrolytic solution is directed by nozzles 66 at the rivet area R of the easy open ends under sufficient force to break surface tension and prevent air entrapment at the rivet bottom. As is shown in FIG. 11, the nozzles are held in place on the edge of the tank 74 by mounting plate 72 which is attached to the tank edge by bolt 76. Liquid is raised to the atomizer through tube 68 by creating a partial vacuum by means of air valve 70. When the liquid is in spray tube 67 air is forced in through the valve 70 to force the liquid through the atomizing nozzle 66 and wet a surface of the container ends. As is shown in FIG. 10, the atomizing nozzles are mounted in tandem.

Figure 12:
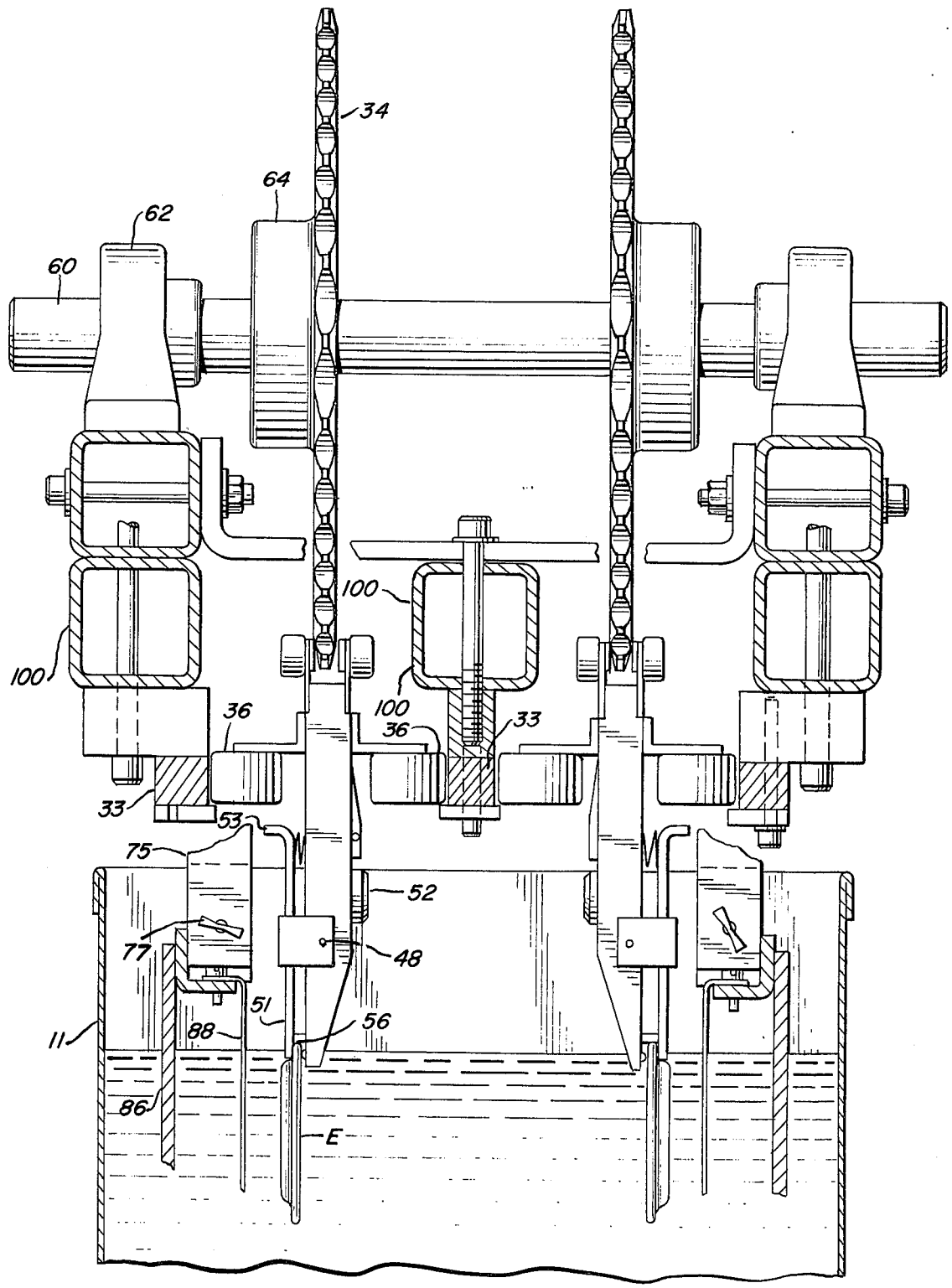
FIG. 12 is a vertical transverse section taken along line 12—12 of FIG. 1 showing the passage of the can ends through the electrolyte in the basin.

The can ends are next conveyed to the electrocoating basin 11 as shown in FIG. 12. The brushes or contact elements 36 or 220 of hanger 1 are in contact with cathodic tracks 33 mounted on frame 100 as they are moved through the basin area. It should be noted that the level of electrolyte in the basin is such that it covers the can end only. The relationship of relative height of solution to the location of the can end is important and the particular one illustrated is preferred, as will be discussed in more detail below. The anodes 86 are attached to anode supports 75 which are mounted upon the basin 11. Separating the anode from the end is an anode guard 88 to prevent accidental contact between the anode and the end. Thumb screws 77 are provided for adjusting the spatial relationship between the anode and the ends as the latter are electrocoated.

Figure 14:
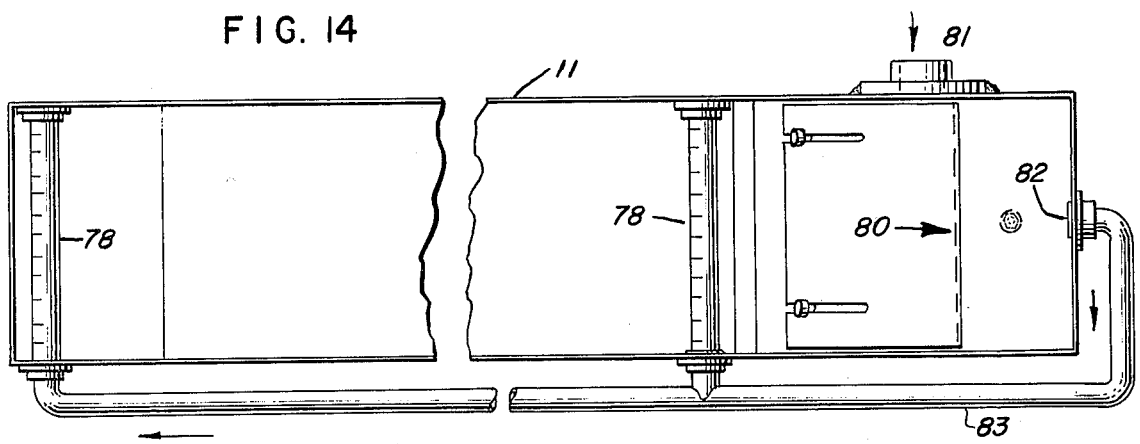
FIG. 14 is a plan view of the basin.
Figure 13:
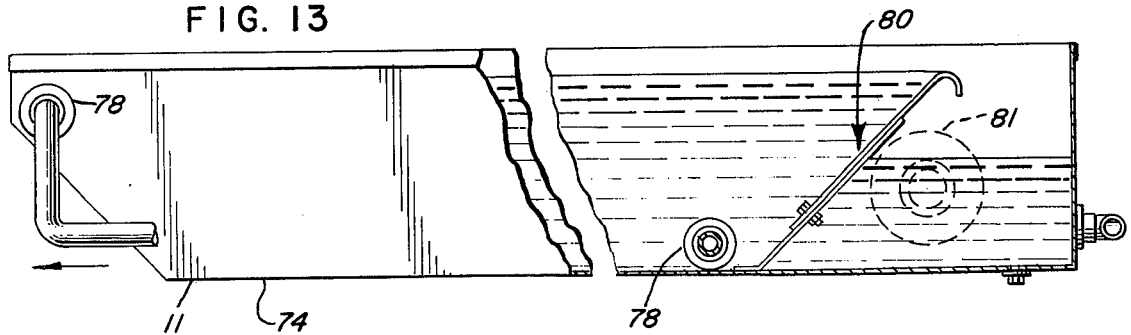
FIG. 13 is a front view, partially in section, of the basin showing means for maintaining an essentially level laminar flow of electrolyte.

If the electrolyte covers the hanger body, it can leave a sticky deposit on the body surface and interfere with the operation of its various parts. The level of electrolyte in the basin is maintained by use of a reservoir and sensing means 140 represented in FIG. 1 in combination with an adjustable weir 80 illustrated in FIGS. 13 and 14. As the hangers pass through the solution, electrolyte is carried out from the supply in the basin. The reservoir and sensing means 140 is designed to maintain the necessary minimum constant level, shown in FIG. 12, where only the ends and a very small portion of hangers 1 are immersed in the liquid solution. Excess solution is spilled out over weir 80 and recirculated through exit port 82 by pipe 83 into inlet tubes 78. As shown in FIG. 14, the inlet tubes 78 are slotted. Electrolyte leaves all the slots under essentially equal pressure to produce an essentially laminar flow which is highly desirable because it aids in producing a uniform continuous coating on the end.

As clearly shown in FIG. 12, there are two cathode tracks 33 for each conveyor 34 and the two cathode tracks, which define fixed cathode track means, are located on opposite sides of the path for hangers 1. Also, cathode tracks 33 are positioned to be between endless conveyors 34 and basin 11. The net effect is that each hanger is supported at one end on conveyor 34 and contact elements 36 or 220, located intermediate opposite ends of hanger body 50 or 200, engage fixed tracks 33, resulting in ends E being a substantially fixed distance from anode 86 as they move through basin 11.

As the hangers leave the basin or trough they pass through a second basin 112 where the ends are sprayed with deionized water to remove any excess solution. They are then subjected to the action of a hot air blower 114 to remove the deionized water and are carried to the hanger release area 6. The hangers are opened and the end released by means of the cam configuration 7 illustrated in FIG. 7 and discussed above in relation to the end insertion procedure. The only difference between the end releasing procedure and the end insertion procedure is that the hangers approach the unloading cams going in an upward, rather than a downward, direction.

Figure 15:
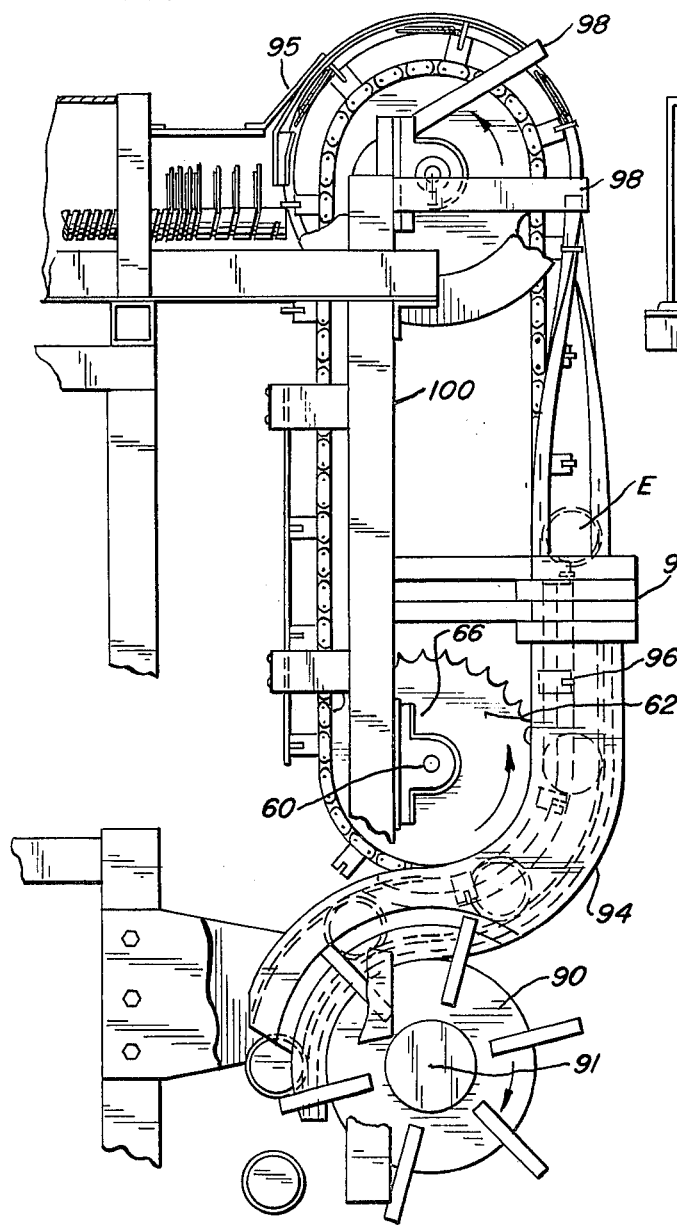
FIG. 15 is a side elevation showing the mechanism for transferring the ends from the hangers to oven conveying screws.
Figure 16:
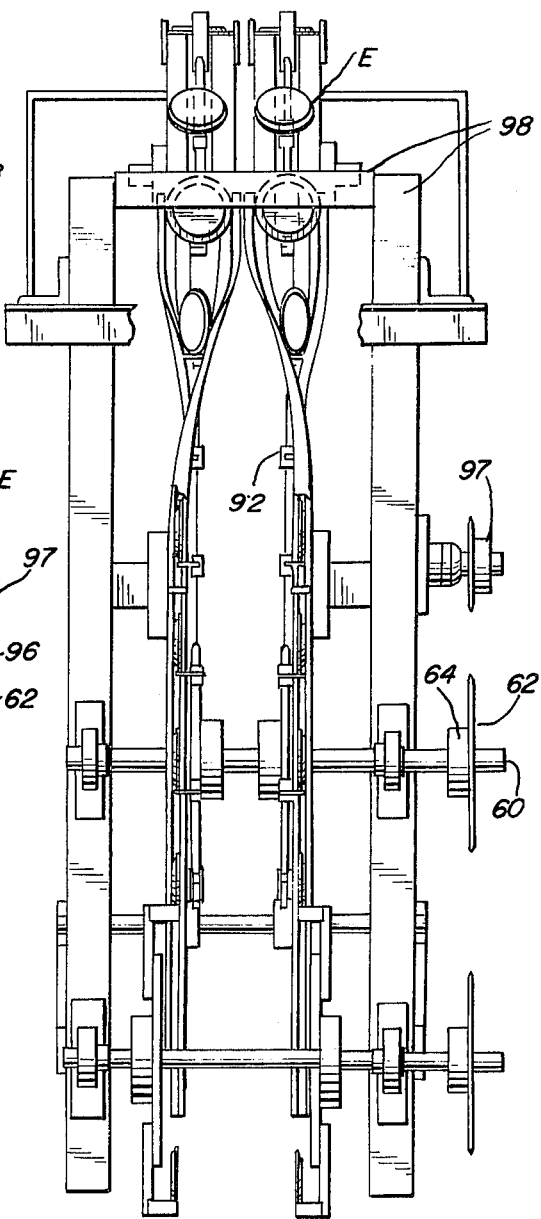
FIG. 16 is an end view of the apparatus shown in FIG. 15.

As shown in FIG. 15, after the hangers are opened, the ends are engaged by guide wheel 90 turning about guide wheel shaft 91 and conveyed along track guide 94 where they are engaged by ball detents 96 which are carried along endless chain 99 and are turned by sprocket means identical to those used to position the endless chain to which the hangers are attached. This assembly, as also shown in FIG. 16, is supported by the support members 98 and support strut 97 which is affixed to the frame 100.

Figure 22:
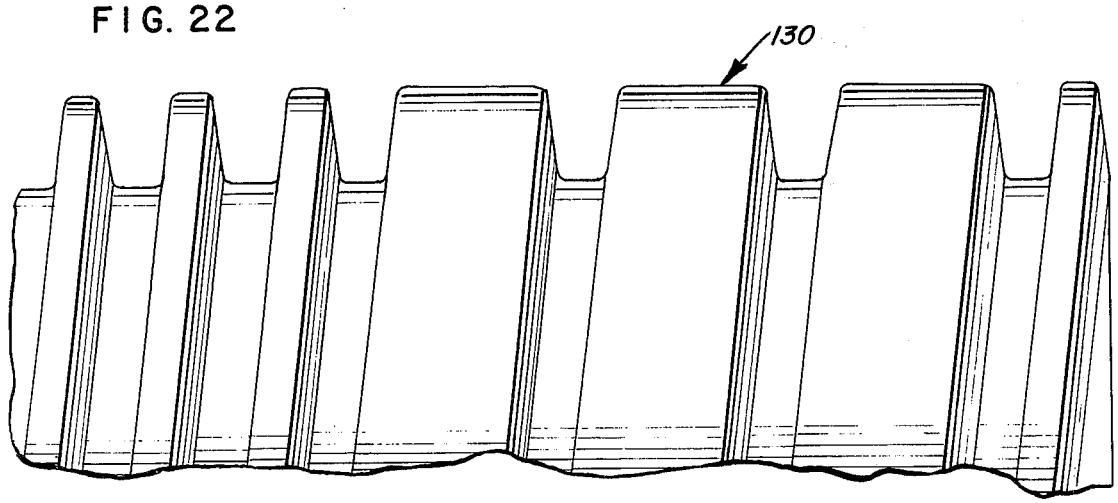
FIG. 22 is a side view of the screw used to carry the ends through the oven.
Figure 21:
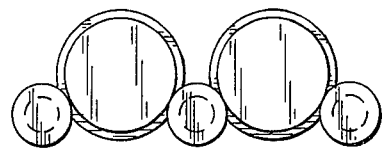
FIG. 21 is a transverse sectional view illustrating ends as they are being conveyed by parallel screws.
Figure 18:
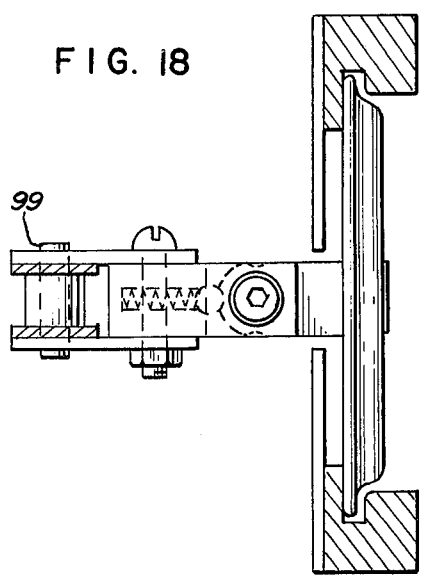
FIG. 18 is a similar cross-sectional view illustrating the position of the mechanism immediately prior to feeding of an end into the screw conveyor.
Figure 19:
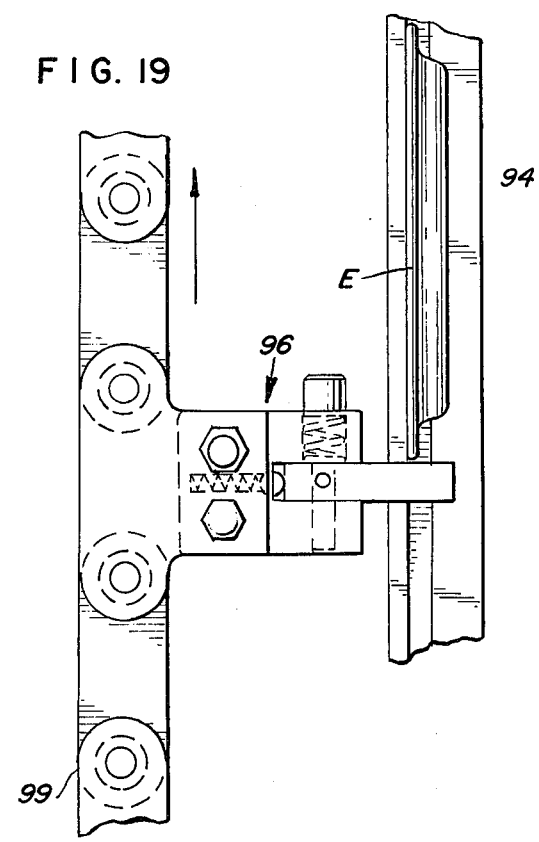
FIG. 19 is a cross-sectional plan view showing the detent mechanism as it is attached to the chain in the position illustrated in FIG. 18.
Figure 17:
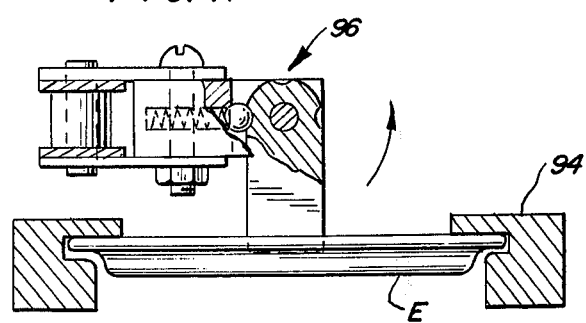
FIG. 17 is a cross-sectional view of the mechanism for carrying ends from a guide wheel to a screw conveyor which conveys the ends through an oven.

FIG. 17 shows the position of the ball detent as it initially engages the can ends. As the ends are conveyed upwardly the guide track turns 90 degrees to reorient the position of the ends as shown in FIG. 16. As the ends are raised over the top sprocket the ball detent assumes the position shown in FIG. 18. The ends are then dropped through the hinged area 95 of the track guide 94 onto endless screw 130. The endless screw 130 conveys the ends to and through a drying oven to fully cure the resin. A representation of the type of screw that is desirable for conveying the can ends is shown in FIGS. 21 and 22. FIG. 22 shows the initial pitch, width at the flat of the root and at the crest of the screw as the ends are released to it. It is desirable to correlate unloading the ends so that they are mated to one root width of the screw 130 while rapid curing indicates that the root width of the screw be decreased. As represented in FIG. 21, one more screw than the number of ends is needed to convey the ends through the oven 200.

Figure 20:
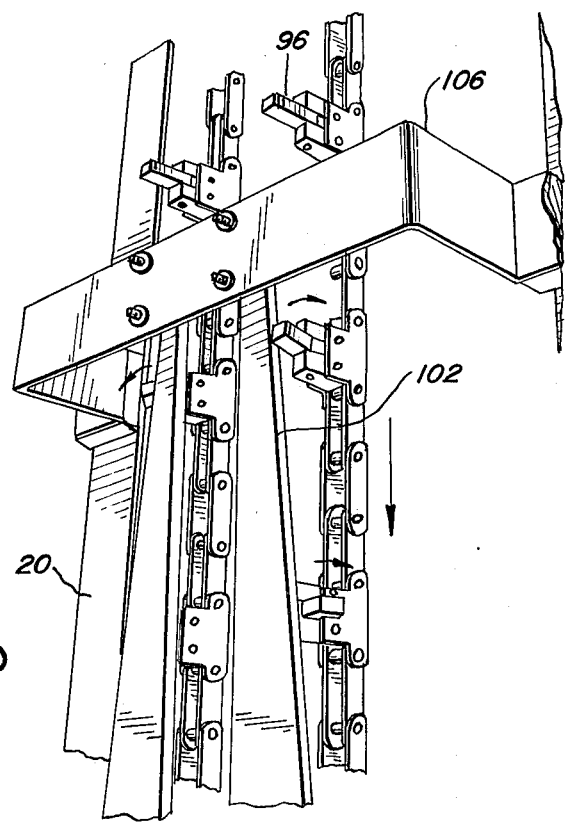
FIG. 20 is an end view of the cam which positions the detent mechanism for end transporting.

Meanwhile, as shown in FIG. 20, the ball detents 96 are carried downwardly past the detent cam 102 bolted to support member 106, as illustrated in FIG. 20. This shifts the detents to the position shown in FIG. 17 so that they are able to engage the next group of ends as they are conveyed around the path of endless chain 99.

As can be appreciated from the above description, the present invention provides a unique method and apparatus for the post repair of ends to insure a uniform coating is produced on the surface which comes in contact with the packaged product, such as beer or carbonated beverages. It will be appreciated that, while the invention has been specifically described in connection with the repair of coated ends, the invention has equal applicability for initially coating a metal end that was preformed without any coating thereon.

What is claimed is:

1. Apparatus for electrocoating objects, such as can ends, in a basin containing electrolytic solution and a fixed anode, comprising an endless conveyor defining a path for objects having an inlet end adjacent one end of the basin and an outlet end adjacent the opposite end of the basin, a plurality of hangers supported on said conveyor for receiving objects and supporting the objects for movement through the solution, and delivery means adjacent the conveyor for delivering objects to the hangers, characterized by each hanger including a body fixed to said conveyor, an electrically conductive jaw pivoted on said body and biasing means biasing said jaw to a closed, gripping position with respect to said body; cam means adjacent said delivery means for pivoting said jaw to an open position receiving objects and allowing said jaw to grip the object; fixed cathode track means adjacent said conveyor and basin; and electrically conductive means on said hangers for engaging said track means and accommodating current flow from said track means through said jaw to an object gripped between said jaw and body.

2. Apparatus as defined in claim 1, in which said electrically conductive means includes spring biased contact elements on said body biased into engagement with said track means.

3. Apparatus as defined in claim 2, in which said electrically conductive means includes means between said contact element and jaw for interrupting current flow to said jaw when there is no object between the body and jaw.

4. Apparatus as defined in claim 2, in which said electrically conductive means includes at least one link pivoted on said body and biased to a first position and roller means on said link for engaging said fixed cathode track means.

5. Apparatus as defined in claim 4, further including a lead wire electrically connecting said at least one link to said pivoted jaw.

6. Apparatus as defined in claim 1, in which said jaw has an insert at one end engaging said end, said insert having means for penetrating a peripheral edge of said end.

7. Apparatus as defined in claim 6, in which said insert is substantially U-shaped and has a base portion connected to said jaw and a pair of legs directed toward said body, said legs having grooves receiving said peripheral edge.

8. Apparatus as defined in claim 1, in which said cathode track means includes a pair of tracks respectively located on opposite sides of said path between said conveyor and said basin and said electrically conductive means includes a pair of spring biased contact elements respectively engaging said tracks.

9. Apparatus as defined in claim 1, further including nozzle means adjacent said path above the electrolytic solution in said basin for directing a spray of electrolytic solution towards the objects.

10. Apparatus as defined in claim 1, further including means in said basin for maintaining essentially laminar flow of said solution along the path of travel of the objects in the basin.

11. Apparatus as defined in claim 1, further including means for maintaining a substantially constant liquid level of the electrolytic solution in the basin so that only the objects and a small portion of each hanger are immersed in said solution.

12. Apparatus as defined in claim 1, further including rinsing means adjacent said basin for rinsing excess solution from the objects.

13. Apparatus as defined in claim 1, in which said body has positioning members which position the objects with respect to the body.

14. Apparatus as defined in claim 1, in which said body has an extension and said extension has a sealing element adapted to engage the object at its periphery.

15. A hanger adapted for supporting objects for electrocoating comprising a body, an electrically conductive jaw pivoted on said body, biasing means normally maintaining said jaw in a first position and electrically conductive means on said body for connecting a power source to said jaw, said electrically conductive means including a spring biased contact element for engaging a fixed conductive track.

16. A hanger as defined in claim 15, in which said electrically conductive means includes a contact on said body and connected to said contact element, said contact being spaced from said jaw when said jaw is in said first position and engaging said jaw when said jaw is pivoted from said first position.

17. A hanger as defined in claim 16, in which said contact is a leaf spring.

18. A hanger as defined in claim 16, in which said body has an extension and said extension has a sealing element adapted to engage the periphery of the object to be supported.

19. A hanger as defined in claim 15, in which said jaw has an insert at one end for engaging said object, said insert having means for engaging a peripheral edge of said object.

20. A hanger as defined in claim 19, in which said insert is substantially U-shaped and has a base portion connected to said jaw and a pair of legs directed toward said body, said legs having grooves receiving said peripheral edge.

21. A method for electrocoating articles, such as can ends, in a basin containing an electrolytic solution and a fixed anode, comprising continuously moving a plurality of hangers along a predetermined path with a lower portion of said path being located directly above said basin, said hangers each having a body portion and an electrically conductive jaw pivoted on said body portion and normally biased to a closed position, pivoting said jaw to an open position at a location upstream of said basin, inserting a peripheral portion of said article between said moving body portion and said jaw and releasing said jaw to grip a peripheral edge of said article, engaging each moving hanger with a fixed cathode track along said lower portion of said path to produce a current flow through said jaw to said article while said article is immersed in said solution, and removing each article from said hangers at a location downstream of said basin.

22. A method as defined in claim 21, in which said basin is an elongated open trough and said anode is an elongated member extending longitudinally of the trough, the further step of maintaining a substantially fixed transverse spacing between said anode and said ends while said ends are in said basin.

23. A method as defined in claim 22, including the further step of producing essentially laminar flow of said solution longitudinally of said trough and in the direction of movement of said articles in said trough.

24. A method as defined in claim 23, including the step of maintaining a substantially constant liquid level of the electrolytic solution in said trough so that only the objects and a small portion of each hanger are immersed in said solution.

25. A method as defined in claim 21, including the step of spraying at least one surface of said ends with an atomized solution prior to entry into said basin to wet a surface of said article.

* * * * *